United States Patent
Croak et al.

(10) Patent No.: US 8,094,568 B1
(45) Date of Patent: Jan. 10, 2012

(54) METHOD AND APPARATUS FOR ENABLING AUTO-TICKETING FOR ENDPOINT DEVICES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 803 days.

(21) Appl. No.: 11/112,903

(22) Filed: Apr. 22, 2005

(51) Int. Cl.
*G06F 11/00* (2006.01)

(52) U.S. Cl. ........ 370/242; 370/216; 370/217; 370/218; 370/221; 370/243; 370/244; 370/245; 370/248; 379/9; 379/9.01; 379/9.03; 379/9.04; 379/221.03; 379/221.04; 714/2; 714/26; 714/31; 714/48

(58) Field of Classification Search .................. 370/216, 370/242, 221, 248; 714/2, 26, 31, 48; 379/9, 379/9.01, 9.03, 9.04, 221.03, 221.04
See application file for complete search history.

(56) References Cited

U.S. PATENT DOCUMENTS

| | | | | |
|---|---|---|---|---|
| 4,972,453 A * | 11/1990 | Daniel et al. | | 379/9.03 |
| 5,666,481 A * | 9/1997 | Lewis | | 714/4 |
| 6,240,105 B1 * | 5/2001 | Zetts | | 370/503 |
| 6,606,744 B1 * | 8/2003 | Mikurak | | 717/174 |
| 6,772,374 B2 * | 8/2004 | Forman et al. | | 714/46 |
| 6,772,376 B1 * | 8/2004 | Merkin et al. | | 714/48 |
| 7,120,819 B1 * | 10/2006 | Gurer et al. | | 714/4 |
| 7,308,492 B2 * | 12/2007 | Konopka et al. | | 709/221 |
| 7,386,761 B2 * | 6/2008 | Abali et al. | | 714/27 |
| 2002/0021671 A1 * | 2/2002 | Quinlan | | 370/242 |
| 2002/0178014 A1 * | 11/2002 | Alexander | | 705/1 |
| 2002/0194319 A1 * | 12/2002 | Ritche | | 709/223 |
| 2004/0103412 A1 * | 5/2004 | Rao et al. | | 717/171 |
| 2004/0120250 A1 * | 6/2004 | Langevin et al. | | 370/216 |
| 2004/0128583 A1 * | 7/2004 | Iulo et al. | | 714/25 |
| 2005/0015644 A1 * | 1/2005 | Chu et al. | | 714/4 |
| 2005/0050182 A1 * | 3/2005 | Neville et al. | | 709/223 |

OTHER PUBLICATIONS

Wik et al., Internet Protocol—Wikipedia, Apr. 10, 2004, Wikipedia.*
CodeGuru, Prevent Long Queries, Sep. 10, 2002, CodeGuru.*

* cited by examiner

*Primary Examiner* — Aung S Moe
*Assistant Examiner* — Hoon J Chung

(57) ABSTRACT

A method and system for transmitting data corresponding to at least one endpoint device problem in a packet communications network is described. Specifically, an endpoint device detects at least one problem that pertains to the endpoint device. The endpoint device then generates data pertaining to the endpoint device problem. Lastly, the endpoint device then transmits the data detailing that endpoint device problem to the packet communications network.

17 Claims, 5 Drawing Sheets

US 8,094,568 B1

METHOD AND APPARATUS FOR ENABLING AUTO-TICKETING FOR ENDPOINT DEVICES

The present invention relates generally to communication networks and, more particularly, to a method and apparatus for enabling auto-ticketing for Internet Protocol (IP) endpoint devices in packet networks, e.g., Voice over Internet Protocol (VoIP) networks.

BACKGROUND OF THE INVENTION

Description of the Related Art

The equipment that customers use to access VoIP networks is becoming increasingly intelligent and sophisticated. As a result, the complexity of the software and firmware related to this equipment typically produce a number of errors and defects. These errors can hinder a user from receiving a high level of service quality when network services are accessed. Consequently, customers typically contact customer care centers and technical support agents who attempt to diagnose the problem and provide a resolution for this equipment. However, the complex nature inherent to this equipment, as well as the difficulty customers typically have in explaining the problem, prolongs these calls and thus increase the cost of providing service.

Therefore, a need exists for a method and apparatus for an auto-ticketing function that transmits data corresponding to an endpoint device problem.

SUMMARY OF THE INVENTION

In one embodiment, a method and system for transmitting data corresponding to at least one endpoint device problem to a packet communications network is described. Specifically, an endpoint device detects at least one problem that pertains to the endpoint device. The endpoint device then generates data pertaining to the endpoint device problem. Lastly, the endpoint device then transmits the data detailing that endpoint device problem to the packet communications network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

This invention provides a tool that enables a customer device (e.g., endpoint device) to self diagnose faults that it experiences and subsequently generate a trouble ticket report, which is sent to the network for resolution and logging. Upon receiving the ticket, the network can provide solutions to the equipment and take other steps necessary to resolve the problem.

Figure 1:
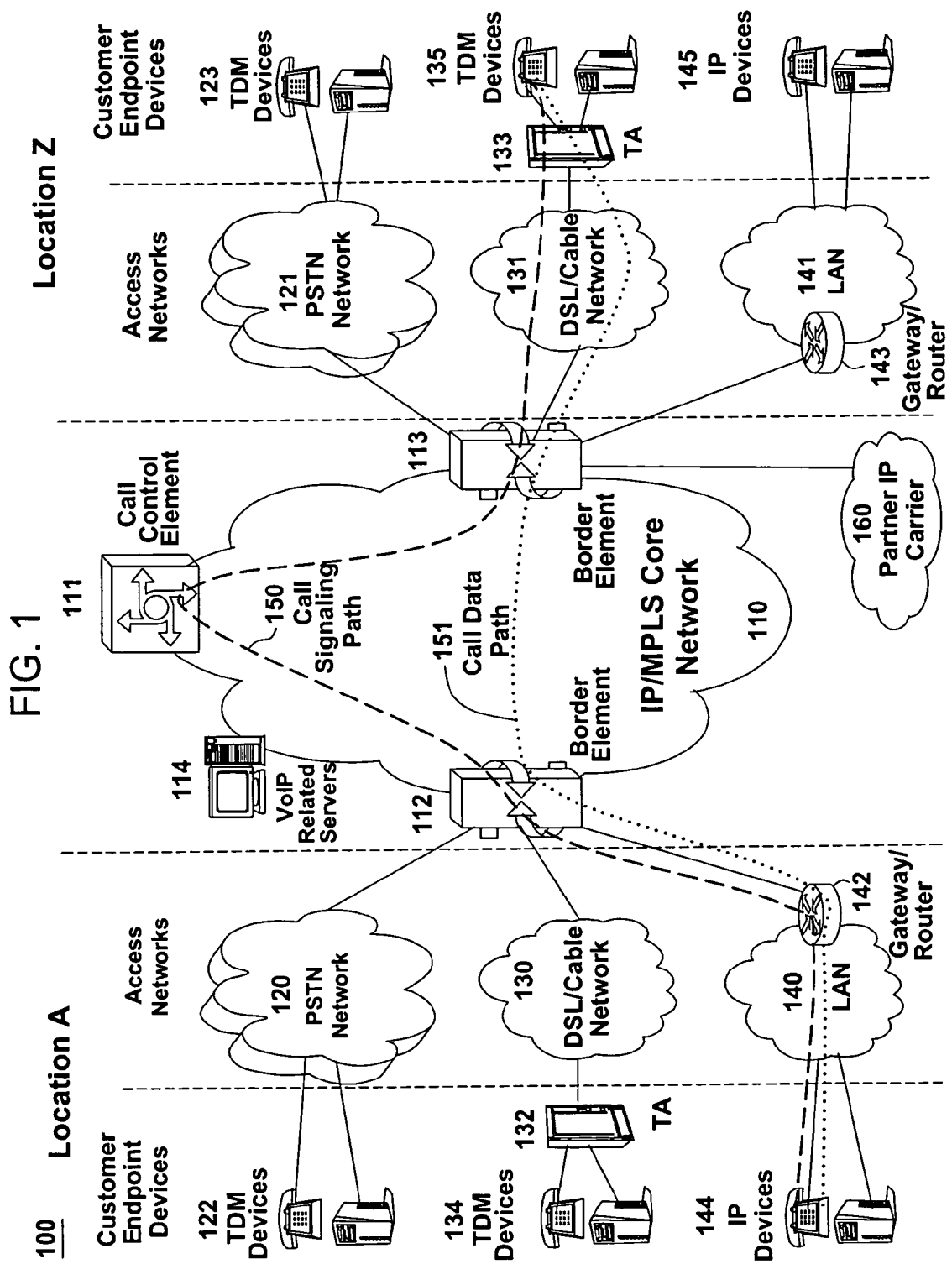
FIG. 1 is a block diagram depicting an exemplary embodiment of a communications system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

FIG. 1 illustrates an example network, e.g., a packet network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively. In one embodiment, an endpoint device may be an Internet protocol (IP) telephone, a terminal adapter (TA), a personal computer (PC), or a TDM device.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

An endpoint device (e.g., TA) frequently needs to communicate with the network on a regular basis in order to maintain compatibility. Notably, the endpoint device contacts (or is contacted by) a network server to determine if there is a need to download any updates, such as new configuration files or other software. On occasion, these downloads are disrupted or fail for any number of reasons. Although the network may still continue to provide service due to failover techniques, the present invention allows the network to transparently remedy problems encountered by an endpoint device.

Figure 2:
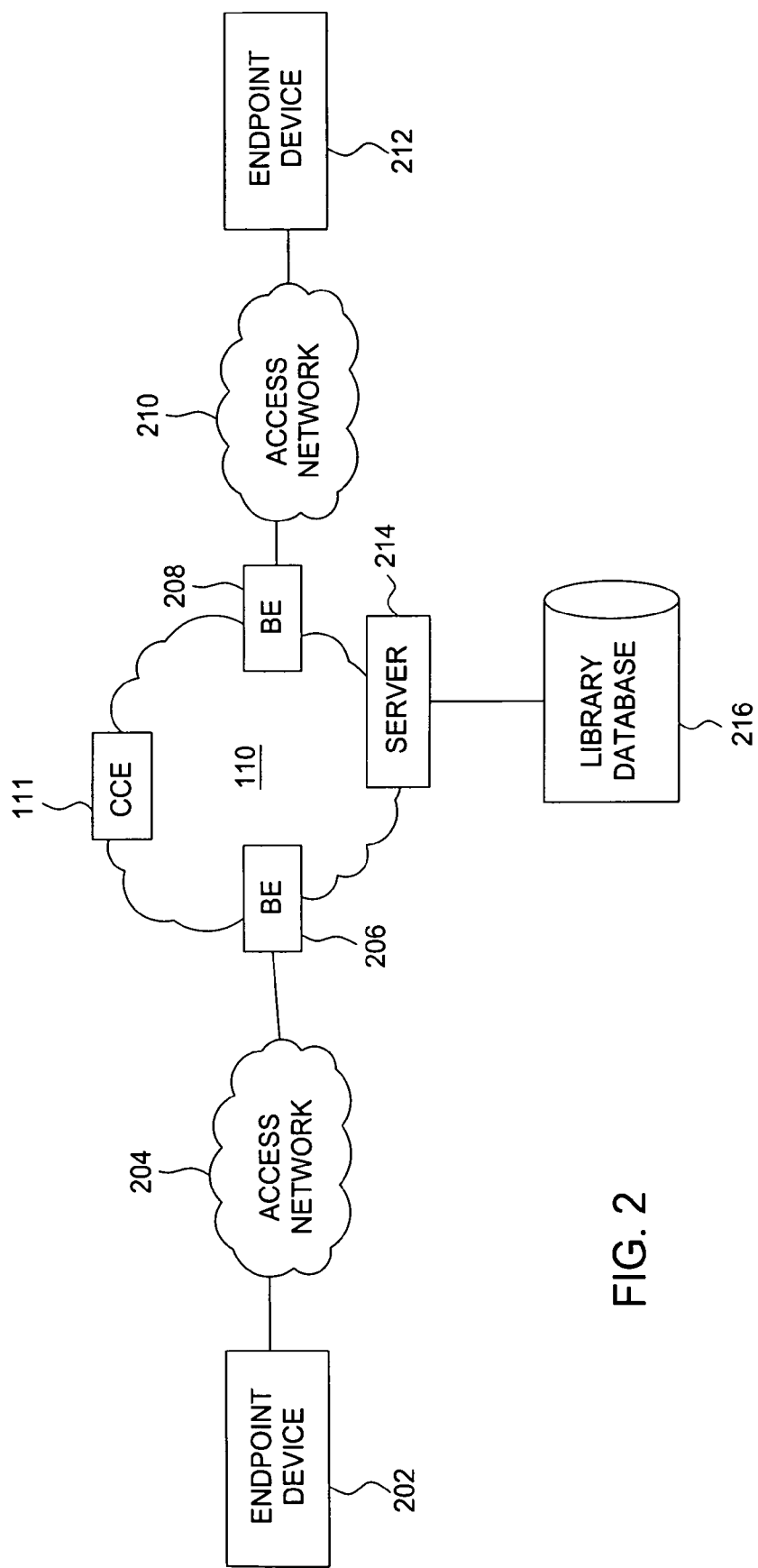
FIG. 2 is a block diagram depicting an exemplary embodiment of a communications system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and a border element (BE) 206. An endpoint device 212 is configured for communication with the core network 110 via an access network 210 and a BE 208. The endpoint device 202 and the endpoint device 212 may comprise any of the customer endpoint devices described above (e.g., TDM devices, IP devices, TAs, etc.). The access networks 204 and 210 may comprise any of the access networks described above (e.g., PSTN, DSL/Cable, LAN, etc).

The core network 110 further includes a server 214 in communication with a solutions database 216. In one embodiment, the server 214 is capable of monitoring various endpoint devices for various problems. Similarly, the library database 216 is configured to store a myriad of possible troubleshooting solutions for the various problems that may be experienced by a given endpoint device.

As an example, consider the scenario in which endpoint device 202 exhibits difficulty with communicating via the network. Upon detecting this problem, the network server 214 is provided data by the endpoint device (or alternatively, obtains data from the endpoint device) and subsequently accesses the library database 216. By correlating the data acquired from the endpoint device with the data in the database, the server will be able to obtain a possible solution for the encountered problem (e.g., supplying the endpoint device with proper port configurations). The server would then transmit the possible solution to the endpoint device 202 via the core network 110. In one embodiment, the network server would continue to supply another possible solution should the previously transmitted solution fail to remedy the problem. In the event the server fails to find an appropriate solution after a predefined period of time, the server may be configured to transmit an alert or alarm to the endpoint device to notify the user of the problem (which may be transparent).

Figure 3:
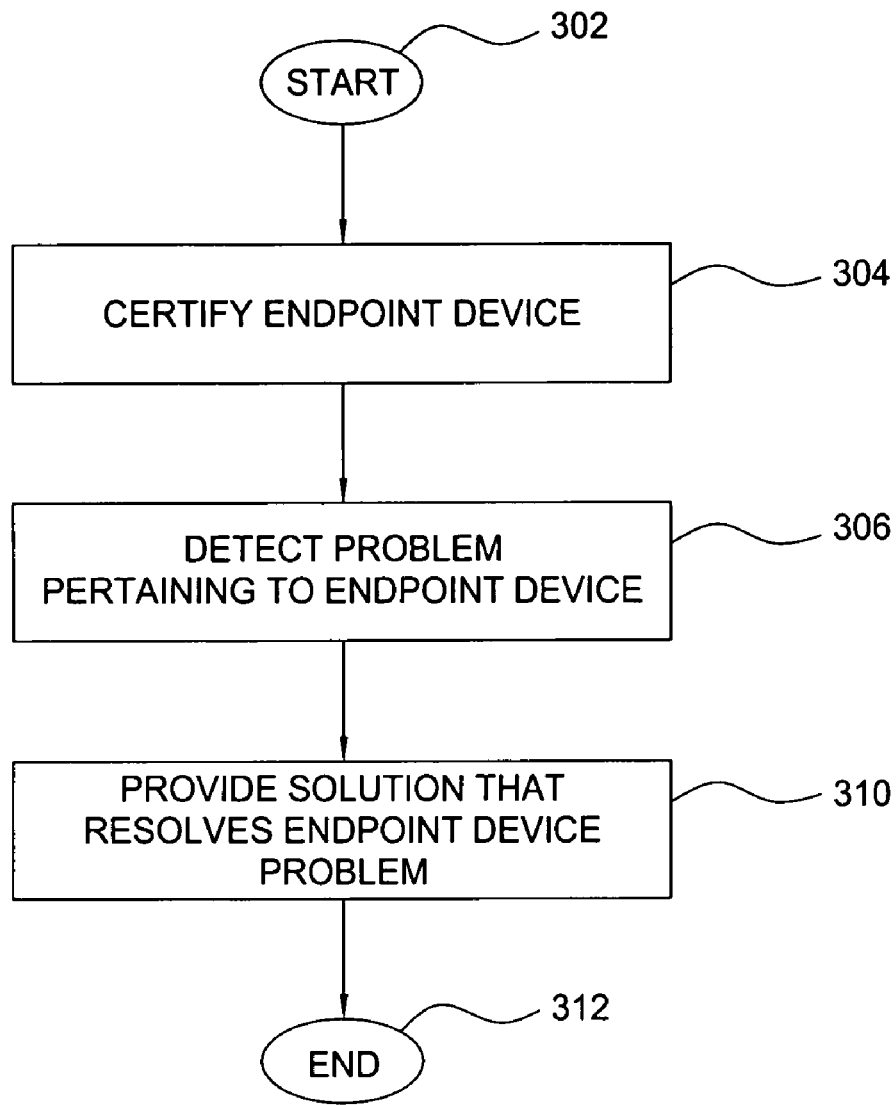
FIG. 3 is a flow diagram depicting an exemplary embodiment of a method for receiving data corresponding to at least one endpoint device problem in a packet network.

FIG. 3 is a flow diagram depicting an exemplary embodiment of a method 300 for receiving data corresponding to at least one endpoint device problem in a packet network in accordance with the invention. Aspects of the method 300 may be understood with reference to the packet network of FIGS. 1 and 2. The method 300 begins at step 302. At step 304, the endpoint device is certified. In one embodiment, the endpoint device undergoes a thorough offline certification process before it is implemented in the network. The certification process is conducted in order to ensure that the endpoint device can successfully communicate with the packet network and is compatible with the services that are available in the network. In one embodiment, the endpoint device needs to be certified by a technician before it may be permitted to transmit any error reports to a network server (e.g., VoIP related server 114 or network server 214) in the network. In another embodiment, the certification process involves a vendor of a particular endpoint device conducting interoperability tests between the device and the network. These interoperability tests are conducted to ensure the endpoint device adheres to specifications (e.g., signaling requirements protocol, encoding scheme, encryption scheme, etc.) provided by the service provider. Notably, these standards detail the requirements the endpoint device must satisfy in order to properly function in a particular packet network.

The method 300 continues to step 306 where a problem pertaining to an endpoint device is detected by the network. This step may be conducted in a manner that is transparent to an endpoint device user. In one embodiment, a network server 114 may capture a log (or statistics) that details the problems or difficulties encountered by the endpoint device. In another embodiment, problems may be detected by the packet network when certain measurable parameters exceed (or fall below) certain threshold levels. For example, some "problems" or "difficulties" encountered by an endpoint device may include an unusually high CPU utilization, inefficient memory allocation, or improper device configuration. All of these types of problems may be monitored by the network server 114. In addition, other parameters that are similar to CPU utilization, memory allocation, and configuration may also be periodically monitored to determine if associated problems relating to the endpoint device exist.

Upon detection of the endpoint device problem, data detailing the problem is utilized by the packet network. In one embodiment, this data may comprise a trouble ticket report that is generated by the endpoint device. The trouble ticket report is one possible format that may be ultimately utilized by the network. The trouble ticket report is transmitted from the endpoint device and is subsequently received by a server associated with a customer care center in the packet network.

At step 310, the solution that resolves the problem is provided by the packet network. In one embodiment the communications network analyzes the data received from step 308 and, if possible, generates at least one solution for the associated problem (e.g., a software patch or upgrade). Alternatively, a notification or announcement may be transmitted to the endpoint device in order to notify the user that a problem associated with the endpoint device exists. Data embodying the solution is then transmitted to the appropriate endpoint device, which then utilizes the data to remedy the problem (if applicable). The method 300 then ends at step 312.

Figure 4:
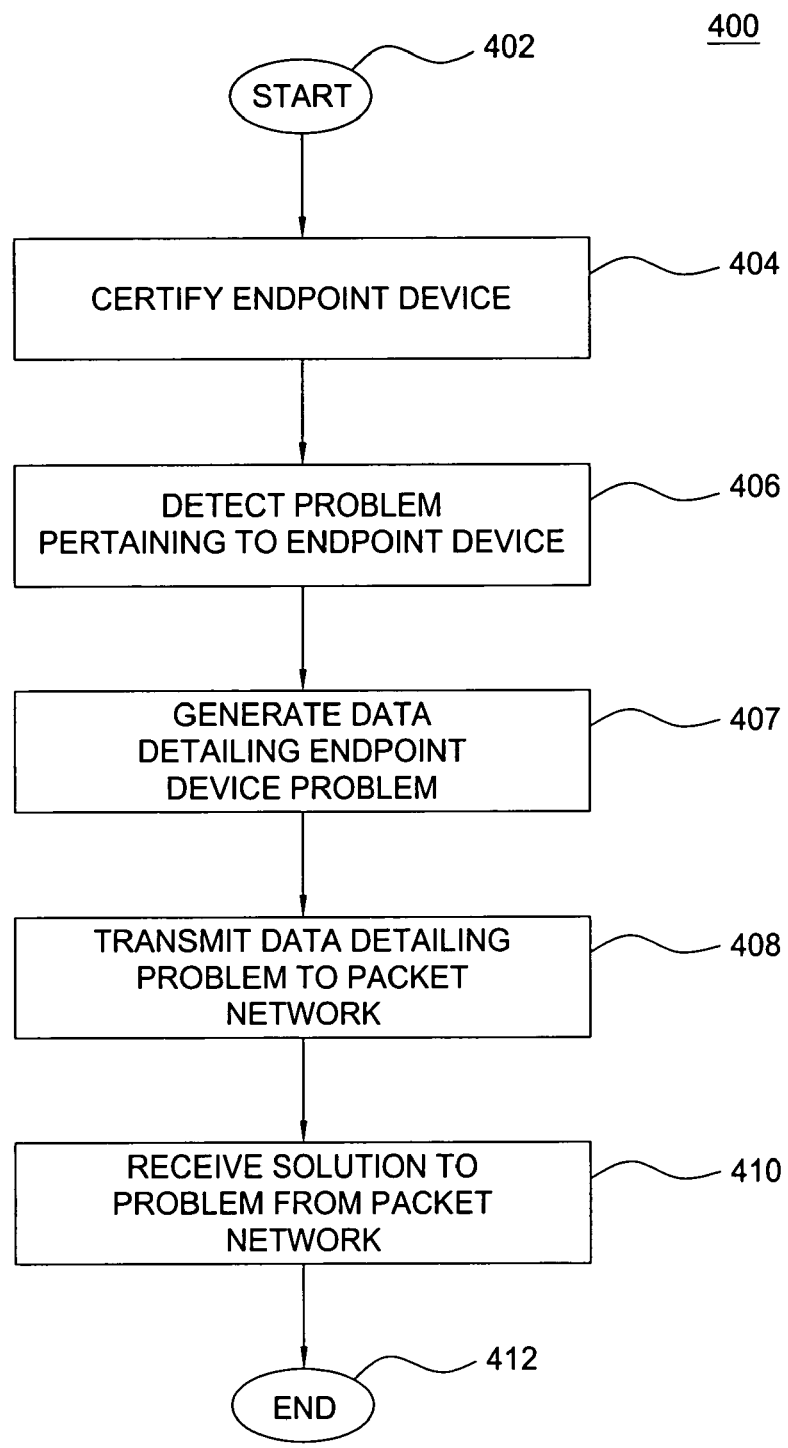
FIG. 4 is a flow diagram depicting an exemplary embodiment of a method for transmitting data corresponding to at least one endpoint device problem in a packet network.

FIG. 4 is a flow diagram depicting an exemplary embodiment of a method 400 for transmitting data corresponding to at least one endpoint device problem to a packet network in accordance with the invention. Aspects of the method 400 may be understood with reference to communications system 100 of FIGS. 1 and 2. Method 400 begins at step 402. At step 404, the endpoint device is certified. In one embodiment, the endpoint device undergoes a thorough offline certification process by a technician before it is implemented in the network. The certification process is conducted in order to ensure that the endpoint device can successfully communicate with the packet network and is compatible with the services that are available in the network. The endpoint device needs to be certified before it may be permitted to transmit any error reports to a dedicated application server (e.g., VoIP related server 114) in the network. In one embodiment, the certification process is similar to the procedure described in step 204 above.

At step 406, a problem pertaining to the endpoint device is detected by the endpoint device. In one embodiment, the endpoint device uses scanning software to monitor and detect any potential problems. This step may be conducted in a manner that is transparent to an endpoint device user (even though an endpoint device problem may or may not be evident to the user). In one embodiment, the endpoint device may utilize a software application that captures a log (or statistics) that details the problems or difficulties encountered by the endpoint device. In another embodiment, problems may be detected when certain measurable parameters exceed (or fall below) certain threshold levels. For example, some "problems" or "difficulties" encountered by an endpoint device may include an unusually high CPU utilization, inefficient memory allocation, or improper device configuration. In addition, other parameters that are similar to CPU utilization, memory allocation, and configuration may also be periodically monitored to determine if associated problems relating to the endpoint device exist. Notably, these problems may be transparent to the user (i.e., the user is not aware of the endpoint device problem).

At step 407, the endpoint device generates data that details the detected endpoint device problem. In one embodiment, the endpoint device generates a trouble ticket report that comprises the data. This data may be any type of information including, but not limited to, raw statistics, a message, or an alarm that indicates the endpoint device problem. In another embodiment, the endpoint device generates a log of the detected problem that is hindering the device's performance and later inserts this data directly into a trouble ticket report.

At step 408, the data that details the problem is transmitted to the packet network. In one embodiment, the trouble ticket report generated in step 407 is transmitted from the endpoint device and is subsequently received by a network server associated with a customer care center. In another embodiment, a user of the endpoint device is offered the option of transmitting the data detailing the problem at a particular point in time, such as at the time of the installation or provisioning of the endpoint device, prior to generating the data for transmission, prior to the actual transmission of data, and the like.

At step 410, a solution relating to the problem is received by the endpoint device from the network. In one embodiment, the network (e.g., a dedicated application server) logs the endpoint device problem, analyzes the data received from step 408 and, if possible, generates at least one solution for the associated problem (e.g., a software patch or upgrade). Alternatively, a notification or announcement may be transmitted to the endpoint device in order to notify the user that a problem associated with the endpoint device exists. This solution may be generated in its entirety or obtained from a database comprising existing solutions for past endpoint device problems and difficulties. If a solution is derived, it is then logged in the database with the corresponding endpoint device problem. Data embodying the solution is then directly transmitted to the appropriate endpoint device, which subsequently utilizes the data to remedy the problem (if applicable). Alternatively, the network may take other measures to remedy the problem associated with the endpoint device. Instead of fixing the endpoint device directly, the network may attempt to fix other network components associated with the troubled endpoint device or take other actions of remediation (e.g., rerouting). The method 400 then ends at step 412.

Figure 5:
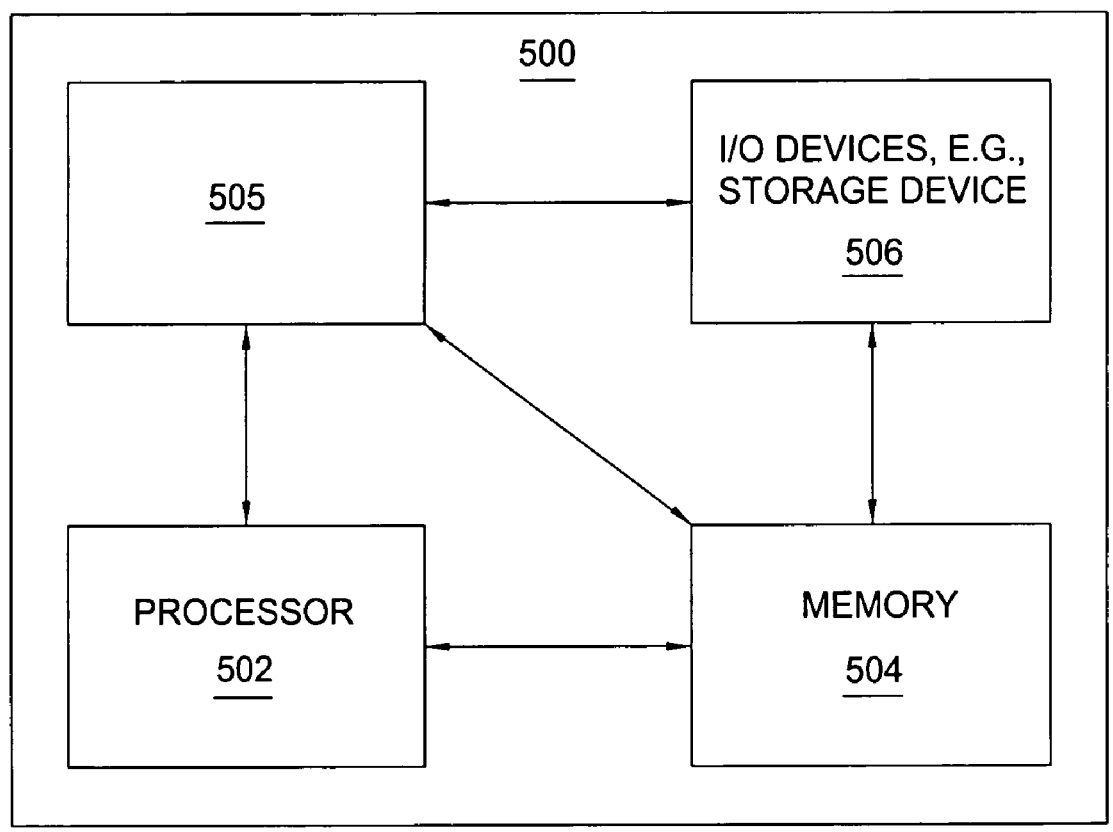
FIG. 5 is a block diagram depicting an exemplary embodiment of a computer suitable for implementing the processes and methods described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), an endpoint device problem detection module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, the system 500 comprises an endpoint device, such as a terminal adapter (TA).

It should be noted that the present invention can be implemented in software and/or in a combination of software and hardware, e.g., using application specific integrated circuits (ASIC), a general purpose computer or any other hardware equivalents. In one embodiment, the present endpoint device problem detection module or process 505 can be loaded into memory 504 and executed by processor 502 to implement the functions as discussed above. As such, the endpoint device problem detection process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for transmitting data corresponding to an endpoint device problem to a packet network, comprising:
   generating the data corresponding to the endpoint device problem at an endpoint device, wherein the data comprises statistics related to the endpoint device problem, wherein the generating is responsive to the endpoint device problem being detected by a server in the packet network, wherein the endpoint device problem comprises a problem with communicating with the packet network;
   transmitting the data from the endpoint device to the packet network, wherein the data is intended to be used for diagnosing the endpoint device problem; and
   receiving an alarm generated by the server in the packet network at the endpoint device associated with a customer if a solution that resolves the endpoint device problem is not found within a predefined period of time, wherein the endpoint device comprises an internet protocol endpoint device.

2. The method of claim 1, wherein the endpoint device is certified to be capable of accessing a service on the packet network.

3. The method of claim 2, further comprising:
   providing the endpoint device that has been certified with an option to transmit the data to the packet network prior to transmitting the data.

4. The method of claim 1, wherein the data comprises a trouble ticket report.

5. The method of claim 1, further comprising:
   if the solution that resolves the endpoint device problem is found, receiving the solution that resolves the endpoint device problem from the packet network.

6. The method of claim 1, wherein the packet network is an internet protocol network.

7. A non-transitory computer readable storage medium having stored thereon instruction that, when executed by a processor, cause the processor to perform a method for transmitting data corresponding to an endpoint device problem to a packet network, comprising:
   generating the data corresponding to the endpoint device problem at an endpoint device, wherein the data comprises statistics related to the endpoint device problem, wherein the generating is responsive to the endpoint device problem being detected by a server in the packet network, wherein the endpoint device problem comprises a problem with communicating with the packet network;
   transmitting the data from the endpoint device to the packet network, wherein the data is intended to be used for diagnosing the endpoint device problem; and
   receiving an alarm generated by the server in the packet network at the endpoint device associated with a customer if a solution that resolves the endpoint device problem is not found within a predefined period of time, wherein the endpoint device comprises an internet protocol endpoint device.

8. The non-transitory computer readable storage medium of claim 7, wherein the endpoint device is certified to be capable of accessing a service on the packet network.

9. The non-transitory computer readable storage medium of claim 8, further comprising:
   providing the endpoint device that has been certified with an option to transmit the data to the packet network prior to transmitting the data.

10. The non-transitory computer readable storage medium of claim 7, wherein the data comprises a trouble ticket report.

11. The non-transitory computer readable storage medium of claim 7, further comprising:
    if the solution that resolves the endpoint device problem is found, receiving the solution that resolves the endpoint device problem from the packet network.

12. The non-transitory computer readable storage medium of claim 7, wherein the packet network is an internet protocol network.

13. A method for providing a solution corresponding to an endpoint device problem in a packet network, comprising:
    detecting by a server in the packet network the endpoint device problem pertaining to an endpoint device, wherein the endpoint device problem comprises a problem with communicating with the packet network;
    receiving data corresponding to the endpoint device problem generated by the endpoint device, wherein the data comprises statistics related to the endpoint device problem, wherein the packet network diagnoses the endpoint device problem using the data transmitted from the endpoint device;
    searching for the solution that resolves the endpoint device problem pertaining to the endpoint device; and
    transmitting an alarm generated by the server in the packet network to the endpoint device associated with a customer if the solution that resolves the endpoint device problem fails to be found within a predefined period of time, wherein the endpoint device comprises an Internet protocol endpoint device.

14. The method of claim 13, wherein the endpoint device is certified to be capable of accessing a service on the packet network.

15. The method of claim 14, further comprising:
providing the endpoint device that has been certified with an option to transmit the data to the packet network prior to transmitting the data.

16. The method of claim 13, wherein the data comprises a trouble ticket report.

17. The method of claim 13, wherein the packet network is an internet protocol network.

* * * * *